United States Patent
Braun et al.

[11] Patent Number: 5,937,651
[45] Date of Patent: Aug. 17, 1999

[54] INTERNAL COMBUSTION ENGINE WITH EXHAUST GAS TURBOCHARGER

[75] Inventors: Tillman Braun, Berglen; Uwe Gärtner, Remshalden, both of Germany

[73] Assignee: Daimler-Benz A.G., Stuttgart, Germany

[21] Appl. No.: 09/109,737

[22] Filed: Jul. 2, 1998

[30] Foreign Application Priority Data

Jul. 3, 1997 [DE] Germany .............................. 198 28 353

[51] Int. Cl.$^6$ .................................................. F02M 25/07
[52] U.S. Cl. ............................................................ 60/605.2
[58] Field of Search ............................................. 60/605.2

[56] References Cited

U.S. PATENT DOCUMENTS

| 4,215,550 | 8/1980 | Dinger et al. | 60/605.2 |
| 5,740,786 | 4/1998 | Gartner | 60/605.2 |

FOREIGN PATENT DOCUMENTS

| 0 620 365 A1 | 10/1994 | European Pat. Off. . |
| 40 97 516 A1 | 9/1991 | Germany . |
| 42 31 218 C1 | 9/1993 | Germany . |

OTHER PUBLICATIONS

Patent Abstracts of Japan, JP7091325, Apr. 4, 1995, Exhaust Gas Refluxing Device for Diesel Engine Having Supercharger, Yukinori et al.

*Primary Examiner*—Michael Koczo
*Attorney, Agent, or Firm*—Klaus J. Bach

[57] ABSTRACT

In an internal combustion engine with a turbocharger including a turbine and a charge air compressor an exhaust gas recirculation line branches off the exhaust pipe downstream of the turbine and leads to a three way mixing valve which is also in communication with a fresh air supply line through which fresh air is supplied to the charge air compressor and then, under increased pressure to the engine, and from which a supply line extends to the fresh air supply line downstream of the charge air compressor, and means are disposed in the supply line for increasing the pressure of the gas in the supply line to the pressure of the fresh air downstream of the charge air compressor for admixing the gas mixture prepared by the mixing valve to the fresh air supplied to the engine.

8 Claims, 2 Drawing Sheets

INTERNAL COMBUSTION ENGINE WITH EXHAUST GAS TURBOCHARGER

BACKGROUND OF THE INVENTION

The invention resides in an internal combustion engine with an exhaust gas turbocharger including an exhaust gas turbine arranged in the exhaust system and a charge air compressor arranged in the fresh air supply of the engine and driven by the exhaust gas turbine.

For the recirculation of exhaust gases of supercharged internal combustion engines for limiting nitrogen oxide emissions, recirculation systems are generally employed in today's engines which extract the exhaust gas to be recirculated from the exhaust system between the engine discharge and the exhaust gas turbine. The exhaust gas is then conducted possibly through a separate heat exchanger and returned to the fresh intake air duct generally downstream of a charge air cooler. Because of the characteristics of the exhaust gas turbocharger, the useable range for exhaust gas recirculation ends where the charge air pressure downstream of the charge air compressor exceeds the exhaust gas pressure upstream of the exhaust gas turbine since then the pressure drop required for the exhaust gas recirculation is no longer available.

DE 42 31 218 C1 discloses an exhaust gas recirculation system wherein the exhaust gas is extracted from the exhaust system in the manner as just described upstream of the exhaust gas turbine and is then pressurized by a separate exhaust gas compressor to a higher pressure so that it can be subsequently admixed to the fresh charge air downstream of the air compressor. The amount of the recirculated exhaust gas is controlled by way of a ³⁄₂ way valve. The separate exhaust gas compressor is driven by the exhaust gas turbine of the exhaust gas turbocharger. In another embodiment, the exhaust gas is compressed by second exhaust gas turbocharger arranged in series with the first exhaust gas turbocharger.

It is however a disadvantage of this exhaust gas recirculation system that it negatively affects the charge change or the engine since exhaust gas is removed upstream of the exhaust gas turbine of the exhaust gas turbocharger whereby the turbine power drops with increased exhaust gas recirculation and accordingly the desirable charge air pressure cannot be reached. This leads to high particle emissions of the engine and to a limitation of the exhaust gas recirculation range since, during exhaust gas recirculation, particularly during full or almost full-load operation of the engine, the combustion air ratio during exhaust gas recirculation is already very critical even with an exhaust gas turbine not disturbed by exhaust gas recirculation. This form of exhaust gas recirculation is also critical with regard to the nonstationary behavior of the internal combustion engine. With ram charging which is common in internal combustion engines, the very high additional volumes of the exhaust gas turbine of the turbocharger detrimentally affect the charging process. In addition, the compressor wheel for the compression of the exhaust gas increases the mass inertia moment of the exhaust gas turbocharger and consequently detrimentally affects the acceleration behavior.

Furthermore, during stationary exhaust gas recirculation operation, the efficiency will probably suffer since the charge air compressor for the fresh air then operates outside its full load design operating range and therefore at relatively low efficiency because only the amount of fresh air without the exhaust gas flow must be compressed, whereas the charge air compressor must be designed such that it can supply the full amount of air required by the internal combustion engine when the exhaust gas recirculation is not in operation.

In an exhaust gas recirculation system with a serial exhaust gas turbocharger, it is disadvantageous that the turbine is always rotating even when no exhaust gas is needed. This detrimentally affects the gas change of the internal combustion engine because of the higher efforts required for discharging the exhaust gas by the piston. With both embodiments, it is uneconomical from the point of view of thermodynamics to first withdraw the operating medium so that it is not supplied to the turbine then compress it and then release excess exhaust gas without using it.

EP 0 620 365 A1 discloses an internal combustion engine with exhaust gas recirculation wherein a conventional exhaust gas turbocharger is provided and a second exhaust gas turbocharger is arranged parallel to the conventional exhaust gas turbocharger solely for compressing exhaust gas. In this case, the exhaust gas to be recirculated is extracted only downstream of the turbine, but the partial exhaust gas flow which serves for driving the second exhaust gas turbocharger is not available for driving the conventional exhaust gas turbocharger. In such an arrangement, the non-stationary behavior is even less satisfactory since during acceleration, it is necessary to shut down the exhaust gas recirculation in order to prevent inadmissible particle emissions whereby first the whole second exhaust gas turbocharger must be uncoupled. Only in this way can the exhaust gas flow through the main (conventional) turbine and the speed of the exhaust gas turbocharger be increased. The partial exhaust gas flow for driving the second turbocharger for the exhaust gas recirculation is therefore lost for the main turbine. For vehicle drive arrangements and ram charging wherein the pressure peaks in the exhaust gas system are utilized such an arrangement is really unsuitable because of the large detrimental volumes in the exhaust gas system. Just like in the previously described state of the art, it is also here disadvantageous that the compressor and the turbine of the main exhaust gas turbocharger need to cover too large a range so that they cannot be tuned for optimal efficiency. In addition, this system is expensive to build, has large space requirements and also the equipment costs are relatively high.

DE 40 07 516 A1 discloses a Diesel engine wherein exhaust gas and air are compressed together in a single compressor. Such an arrangement however requires a particle filter to prevent deposits in and wear of the compressor and any intercooler arranged downstream of the compressor. The expenses for a particle filter and the regeneration equipment therefor are a disadvantage in such an arrangement.

It is therefore the object of the present invention to provide an internal combustion engine of this type in which however, the effect of the exhaust gas recirculation is available for the whole engine operating range without detrimental effects on the charge change of the engine and on the non-stationary behavior of the engine and wherein relatively few building components are required for the exhaust gas recirculation.

SUMMARY OF THE INVENTION

In an internal combustion engine with a turbocharger including a turbine and a charge air compressor an exhaust gas recirculation line branches off the exhaust pipe downstream of the turbine and leads to a three way mixing valve which is also in communication with a fresh air supply line through which fresh air is supplied to the charge air compressor and then, under increased pressure to the engine, and from which a supply line extends to the fresh air supply line downstream of the charge air compressor, and means are disposed in the supply line for increasing the pressure of the gas in the supply line to the pressure of the fresh air downstream of the charge air compressor for admixing the gas mixture prepared by the mixing valve to the fresh air supplied to the engine.

With the arrangement according to the invention, the gas charge change of the internal combustion engine remains undisturbed in any operating state, that is the engine charge remains always the same; only its composition changes. The composition is controlled in accordance with the invention by a three-way mixing valve which can control the gas flows in such a way that only exhaust gas is supplied to the pressure increasing means (secondary compressor), that a mixture of exhaust gas and fresh air which is extracted from the fresh air supply line is supplied to the secondary compressor, or that only fresh air extracted from the fresh air supply line is conducted through the secondary compressor.

Furthermore, the advantages of ram charging of the engine cylinders are retained. For acceleration out of an operating phase with exhaust gas recirculation, the full exhaust gas turbocharger speed is immediately available. The exhaust gas turbine, the charge air compressor and the secondary compressor can be operated always at optimal efficiency like with an equal engine without exhaust gas recirculation.

Also, all the advantages of exhaust gas recirculation in the nitrogen oxide/fuel consumption balance remain fully intact —in contrast to prior art arrangements—since the recirculation of the exhaust gases does not result in a deterioration of the gas change.

Further, the particle emission is improved since a reduction of the combustion air exhaust gas ratio is obtained by changing the mixing ratio not by reducing the exhaust gas turbine power. As a result, the arrangement according to the invention operates during exhaust gas recirculation at a substantially higher charge level than any of the prior art arrangements.

It is furthermore advantageous that, for example in comparison with the arrangement of DE 42 31 218, the secondary compressor has a lower exposure to the high exhaust gas temperature since the exhaust gas extracted from the system downstream of the exhaust gas turbine is substantially cooler than the exhaust gas upstream of the exhaust gas turbine.

Finally, the arrangement according to the invention requires fewer components than the prior art arrangements since for example a second turbine and one of the valves can be eliminated. In addition, the arrangement according to the invention is equally suitable for vehicle engines and for stationary engines. Generally, there is no need to install a particle filter.

Preferred embodiments of the invention will be described below in greater detail on the basis of the accompanying drawings.

DESCRIPTION OF THE PREFERRED EMBODIMENTS

Since exhaust gas recirculation systems are well known as far as the basic arrangements and their operation is concerned only the arrangements according to the invention will be described below in detail.

Figure 1:
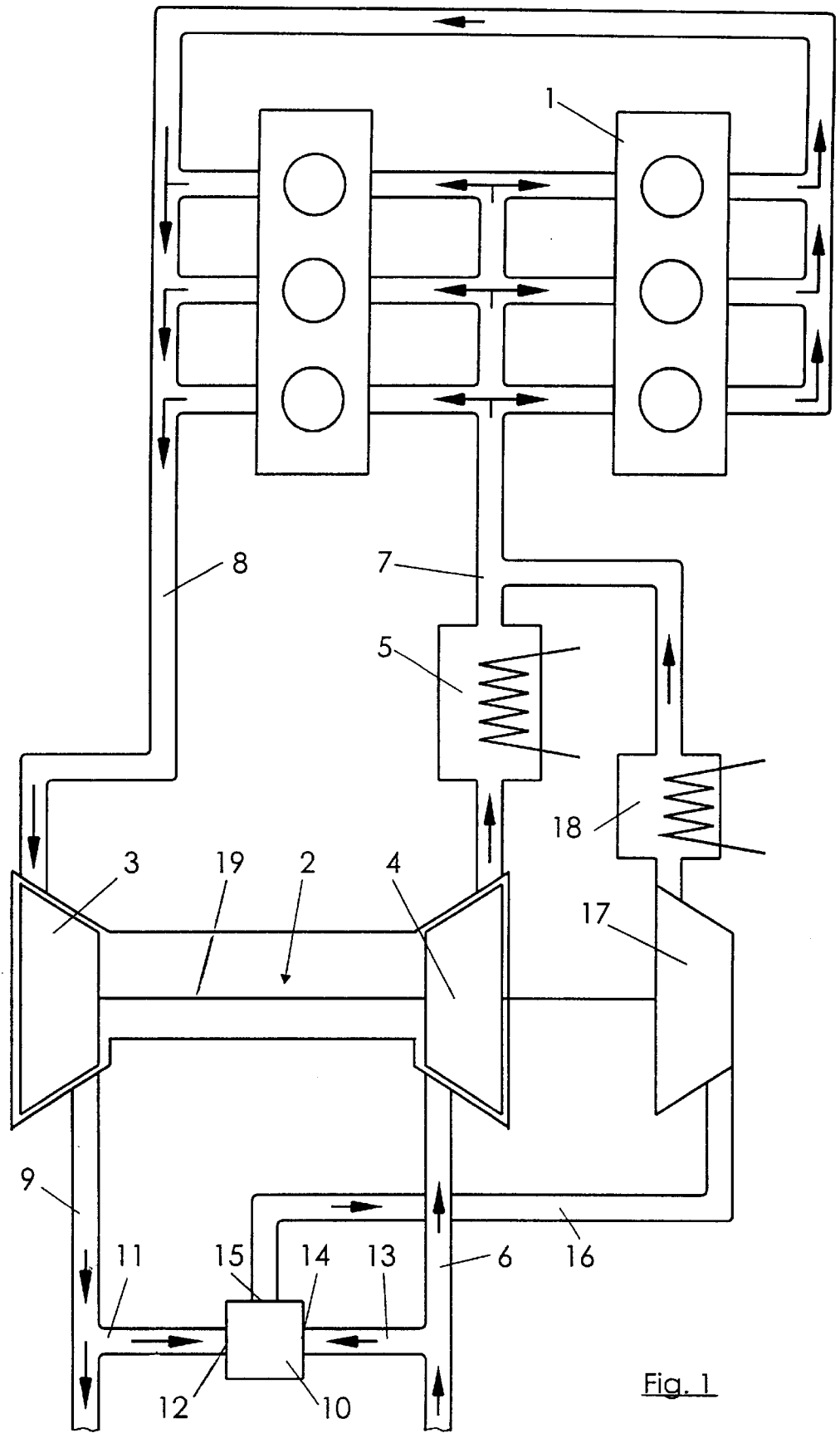
FIG. 1 shows schematically an internal combustion engine with one embodiment of the exhaust gas recirculation arrangement according to the invention, and FIG. 2 show schematically an internal combustion engine with another embodiment of the exhaust gas recirculation arrangement.
Figure 2:
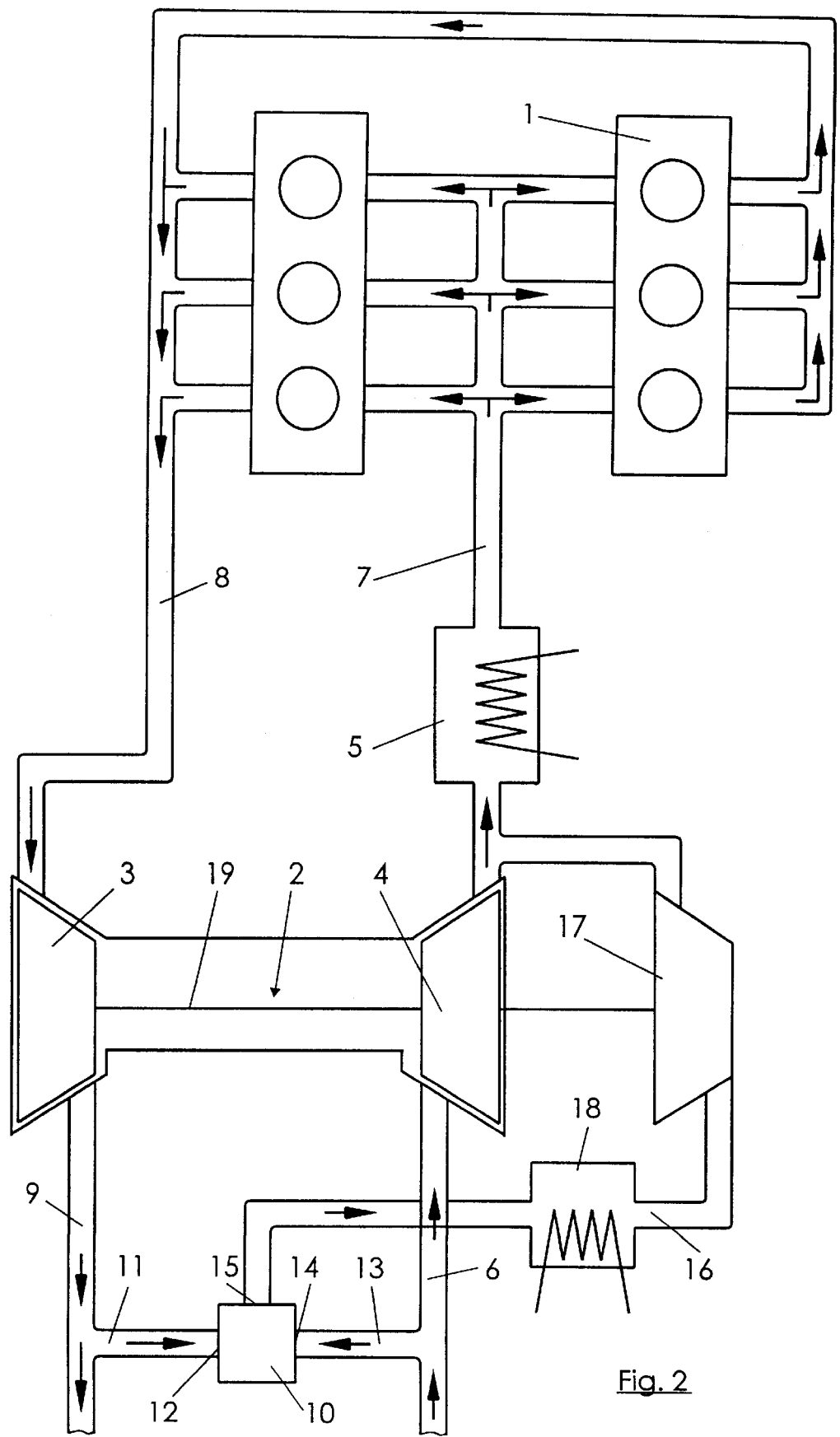

In the embodiments as shown in FIGS. 1 and 2, the engine shown is a Diesel engine 1 with six cylinders in a V-type arrangement. The Diesel engine 1 includes an exhaust gas turbocharger 2 including an exhaust gas turbine 3 and a charge air compressor 4 and a charge air cooler 5. The charge air compressor 4 is disposed in a fresh air supply line 6 and the charge air cooler 5 is disposed in a charge air line 7 through which fresh air compressed by the charge air compressor 4 is supplied to the cylinders of the Diesel engine 1.

The exhaust gases of the Diesel engine leave the cylinders by way of an exhaust gas pipe 8, which leads to the inlet of the exhaust gas turbine 3. From the exhaust side of the exhaust gas turbine an exhaust pipe 9 extends to an exhaust system which is not shown.

A three-way mixing valve 10 is arranged in an exhaust gas recirculation line 11 such that it communicates with the exhaust gas recirculation line by way of a first inlet 12. A branch line 13 extends between the fresh air supply line 6 and a second inlet 14 of the three way mixing valve 10. The three way mixing valve 10 has further an outlet 15 from which a supply line 16 extends to a secondary compressor 17. From the secondary compressor 17, the supply line 16 leads to a heat exchanger 18 and then to the charge air line 7 to which it is connected between the charge air cooler 5 and the cylinders of the Diesel engine as shown in FIG. 1.

The charge air compressor 4 and the secondary compressor 17 disposed in the supply line 16 are both driven by the exhaust gas turbine 3 by way of a drive shaft 19.

By means of three-way valve 10, either exclusively exhaust gas from the exhaust pipe 9 or exclusively fresh air from the fresh air supply line 6 or a mixture of the two can be supplied to the secondary compressor 17.

The following operational modes are possible:

1. Operation of the Diesel engine with the maximum exhaust gas recirculation rate:

The three way mixing valve 10 completely closes the branch line 13 and, consequently, the connection with the fresh air supply line 6 so that the secondary compressor 17 sucks in exclusively exhaust gas from the exhaust pipe 9. The desired exhaust gas recirculation rate determines the size or, respectively, the pumping volume of the two compressors 4 and 17. If, for example, a maximum recirculation rate of about 25% is desired, the compressors 4 and 17 should have a pumping volume capability relationship of 3:1.

2. Operation of the Diesel engine 1 without exhaust gas recirculation:

The three-way mixing valve 10 closes off the exhaust gas recirculation line 11 so that exclusively fresh air from the fresh air supply line 6 is supplied to both compressors 4 and 17. The fresh air flow then corresponds to that of an engine of the same size without exhaust gas recirculation.

3. Operation of the Diesel engine 1 with exhaust gas recirculation rates of between 0 and maximum:

The three-way mixing valve 10 mixes the exhaust gas volume entering from the exhaust pipe 9 with the fresh air entering by way of the branch line 13 in such a way that the desired exhaust gas recirculation rate is obtained. If for example, an exhaust gas recirculation rate of 10% is to be obtained then, with a compressor arrangement as indicated for case 1, the gas flow balance is as follows:

75% of the gas supplied to the engine comes through the charge air compressor 4, 25% of the gas supplied to the engine comes through the secondary compressor 17 as an exhaust gas air mixture with a fresh air content of 15%.

The position of the three-way mixing valve 10 depends on the momentary operating state of the Diesel engine 1. In the simplest case, a performance graph can be used for controlling the three-way mixing valve 10. To satisfy more demanding requirements, the three-way valve can be controlled on the basis of a determination of the air mass flow in the fresh air supply line 6 or the concurrent determination of the carbon dioxide concentration in the charge air line 7 and in the exhaust pipe 9, the ratio of which corresponds to the exhaust gas recirculation rate in percent.

Generally, the two compressors 4 and 17 are different in that they consist of different materials. The material for the secondary compressor 17 must be so selected that it can withstand particle depositions and high temperature loads as it is exposed to hot exhaust gases.

It is, of course also possible for the secondary compressor 17 to be independently driven, for example, by an electric motor. Also, instead of a hydrodynamic compressor any other type of compressor such as a displacement compressor, for example, a Roots charger could be used. In that case, the exhaust gas turbine 3 could be smaller and excess exhaust gas could be controllably discharged by way of a bypass (wastegate) according to the lower compression work needed.

According to the embodiment shown in FIG. 1, the supply line 16 with the secondary compressor 17 and the heat exchanger 18 joins the charge air line 7 downstream of the air cooler 5.

If the charge air cooler 5 is of a type which is resistant to wear and deposits, an arrangement as shown in FIG. 2 could be utilized for the exhaust gas recirculation. In this case, the supply gas flow including the recirculated exhaust gas which has been compressed in the secondary compressor 17 joins the charge air line 7 upstream of the charge air cooler 5, which then cools the mixture of exhaust gas and fresh air to the desired temperature. Since the embodiment shown in FIG. 2 is otherwise the same as that of FIG. 1, the same reference numerals have been used for FIG. 2. Furthermore, for the same reasons, the recirculation arrangement is not described in detail for FIG. 2. It is however mentioned that, in this case, another heat exchanger 18 may be provided in the supply line 16 upstream of the secondary compressor 17. Basically, such a heat exchanger is not needed, but it would reduce deposits in the secondary compressor 17 and the secondary compressor would operate at a lower temperature which could greatly extend the life of the secondary compressor 17. The same is true for the charge air cooler 5, which, in this way, would be subjected only to a relatively small amount of deposits and not to the high exhaust gas temperatures.

Since the two compressors 4 and 17 are operated in unison and since, when necessary also only fresh air can be supplied to the secondary compressor 17, the charge air compressor 4 can be designed for a correspondingly lower output. The design features are to be selected for maximum gas flow at full engine power. The total size is determined based on this consideration. Depending on the desired exhaust gas recirculation rate, the sizes of the two compressors or their design is then selected.

What is claimed is:

1. An internal combustion engine with an exhaust system with an exhaust pipe and a charge air system including a fresh air supply line, an exhaust gas turbocharger including an exhaust gas turbine arranged in said exhaust pipe so as to be driven by the exhaust gas of said engine and a compressor disposed in said fresh air supply line for compressing the charge air supplied to said engine, an exhaust gas recirculation line branching off said exhaust gas pipe downstream of said exhaust gas turbine, a three way mixing valve disposed in said exhaust gas recirculation line and having a first inlet connected to said recirculation line for receiving exhaust gas from said exhaust pipe, a second inlet in communication with said fresh air supply line, and an outlet from which a supply line extends to said charge air line downstream of said charge air compressor, said supply line including a means for increasing the pressure of the gases returned to said charge air line to the pressure in said charge air line downstream of said charge air compressor.

2. An internal combustion engine according to claim 1, wherein said means for increasing the pressure of the gases returned to said charge air line is a secondary compressor.

3. An internal combustion engine according to claim 2, wherein said charge air compressor and said secondary compressor have flow volumes of a ratio determined by the maximum recirculation rate and the charge air flow requirement of the internal combustion engine during an operating phase in which no exhaust gas is recirculated.

4. An internal combustion engine according to claim 2, wherein said charge air compressor and said secondary compressor are together connected to said turbine so as to be driven thereby.

5. An internal combustion engine according to claim 1, wherein said three-way mixing valve is controllable in dependence on the carbon dioxide concentration in the charge air line and in the exhaust gas recirculation line.

6. An internal combustion engine according to claim 1, wherein said charge air line includes an air cooler arranged downstream of said air compressor and said supply line is connected to said charge air line downstream of said air cooler.

7. An internal combustion engine according to claim 1, wherein said charge air line include an air cooler and said supply line connected to said charge air line upstream of said air cooler.

8. An internal combustion engine according to claim 1, wherein a heat exchanger is arranged in said supply line between said three-way mixing valve and said means for increasing the pressure of the gases returned to said charge air line.

* * * * *